Figure 4:
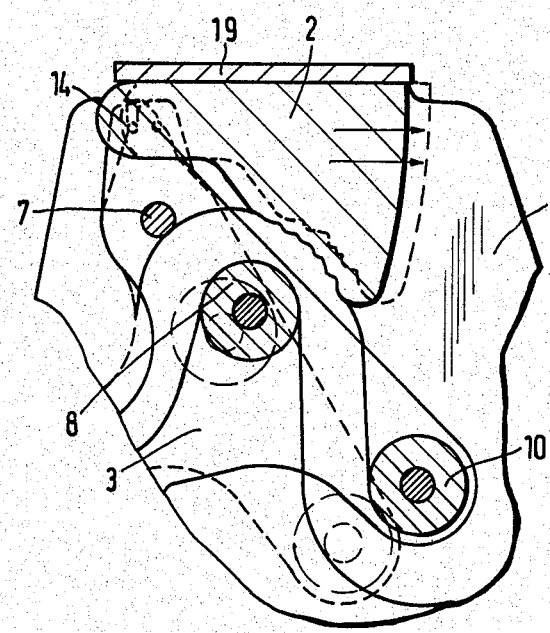

United States Patent [19]

Adomeit

[11] Patent Number: 4,528,727
[45] Date of Patent: Jul. 16, 1985

[54] APPARATUS FOR RELEASABLY CLAMPING AN ELONGATE MEMBER

[76] Inventor: Heinz-Dieter Adomeit, Grolmanstrasse 16, D-1000 Berlin 12, Fed. Rep. of Germany

[21] Appl. No.: 557,643

[22] Filed: Dec. 2, 1983

[30] Foreign Application Priority Data

Dec. 16, 1982 [DE] Fed. Rep. of Germany ....... 3246638

[51] Int. Cl.³ .............................................. F16G 11/04
[52] U.S. Cl. .......................... 24/132 R; 24/132 WL; 24/133; 24/134 KB; 269/87
[58] Field of Search ...... 24/132 R, 132 AA, 132 WL, 24/133, 134 R, 134 KA, 134 KB, 134 L, 134 N, 134 P, 191, 115 G; 269/87, 95

[56] References Cited

U.S. PATENT DOCUMENTS

| 209,137 | 10/1878 | Rotschka et al. | 24/132 R |
|---|---|---|---|
| 299,967 | 6/1884 | Davis | 24/132 R |
| 2,478,994 | 8/1949 | White | 24/132 R |
| 3,344,486 | 10/1967 | Eveland | 24/191 |
| 3,599,297 | 8/1971 | Sievers | 24/132 R |
| 3,605,205 | 9/1971 | Crissy | 24/191 |
| 3,967,349 | 7/1976 | Christensen | 24/132 WL |
| 4,077,696 | 3/1978 | Glaesel | 24/132 WL |
| 4,308,643 | 1/1982 | Montplaisir | 24/132 WL |
| 4,444,379 | 4/1984 | Hopkins | 269/87 |

FOREIGN PATENT DOCUMENTS 2346908  4/1974  Fed. Rep. of Germany .... 24/132 R
2432956  5/1976  Fed. Rep. of Germany .

Primary Examiner—Victor N. Sakran
Attorney, Agent, or Firm—Michael L. Dunn; Donald C. Studley

[57] ABSTRACT

Described is an apparatus for releasably clamping a cable or line (6), comprising a housing (1), a clamping lever (3) which is mounted rotatably thereon (at 7) and two clamping surfaces (2, 8) of which the first is arranged on the housing (1) and the second is arranged on the clamping lever (3) and between which the cable or line (6) passes. The cable is also passed around at least one direction-changing means (8-10), the clamping lever (3) being designed for a lever ratio b/a such that at most the coefficient of friction $\mu$ is attained at the frictional location.

So that the amount of space required is reduced, while nonetheless ensuring that the cable or line is securely held, even under a steady or fluctuating tensile loading, as well as ensuring easy and defined opening of the arrangement, the invention provides that disposed on the clamping lever (3) are three direction-changing locations (8-10), the axes of which extend parallel to the axis of rotation (7) of the clamping lever (3) and parallel to each other and clamp a triangle, and that a release lever (4) which is rotatably mounted (at 11) in the housing (1) is provided with a release cam (12) for acting on an engagement member (10; 22) secured to the clamping lever (3).

9 Claims, 10 Drawing Figures

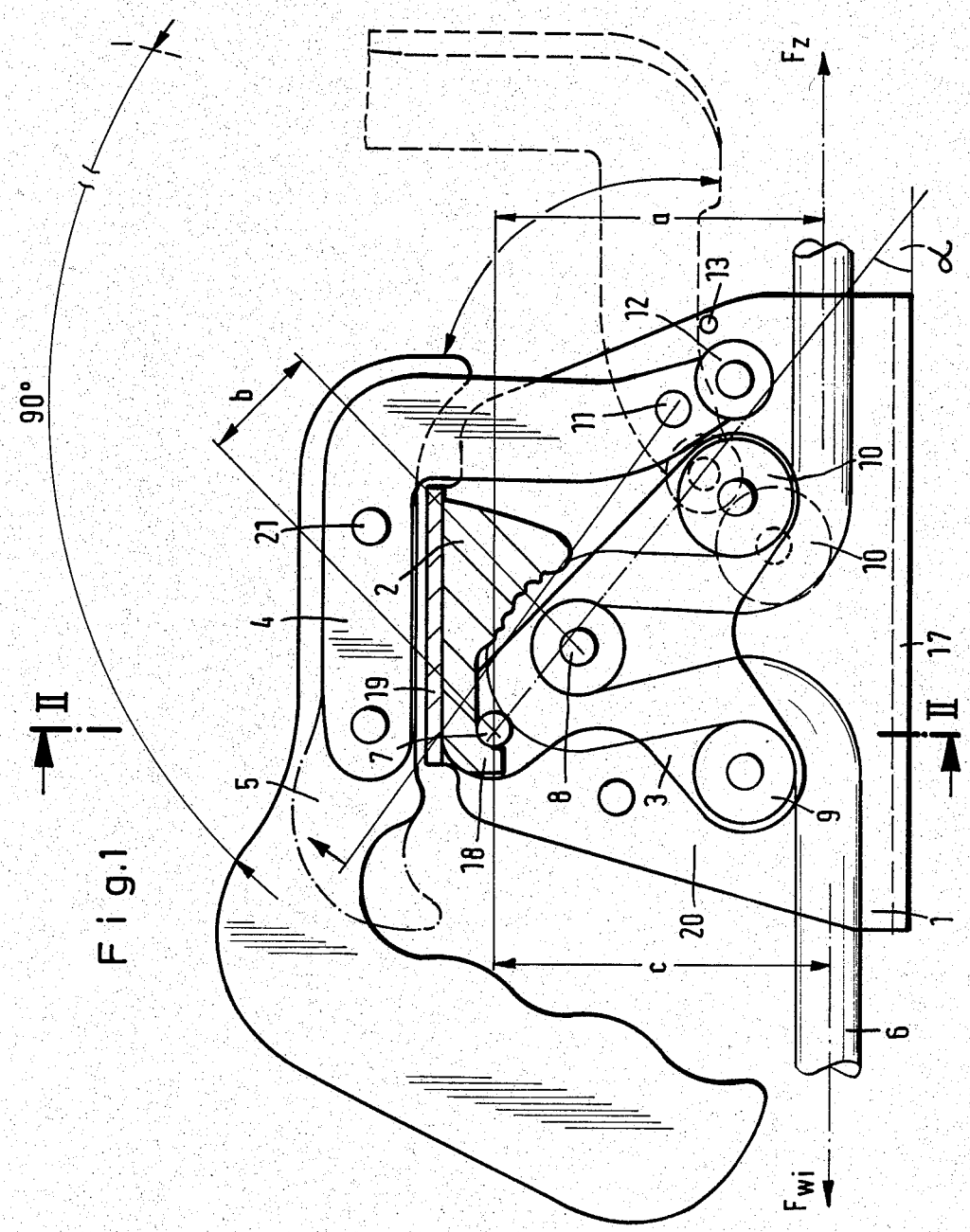
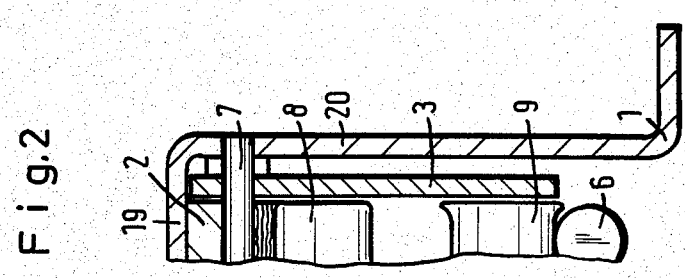

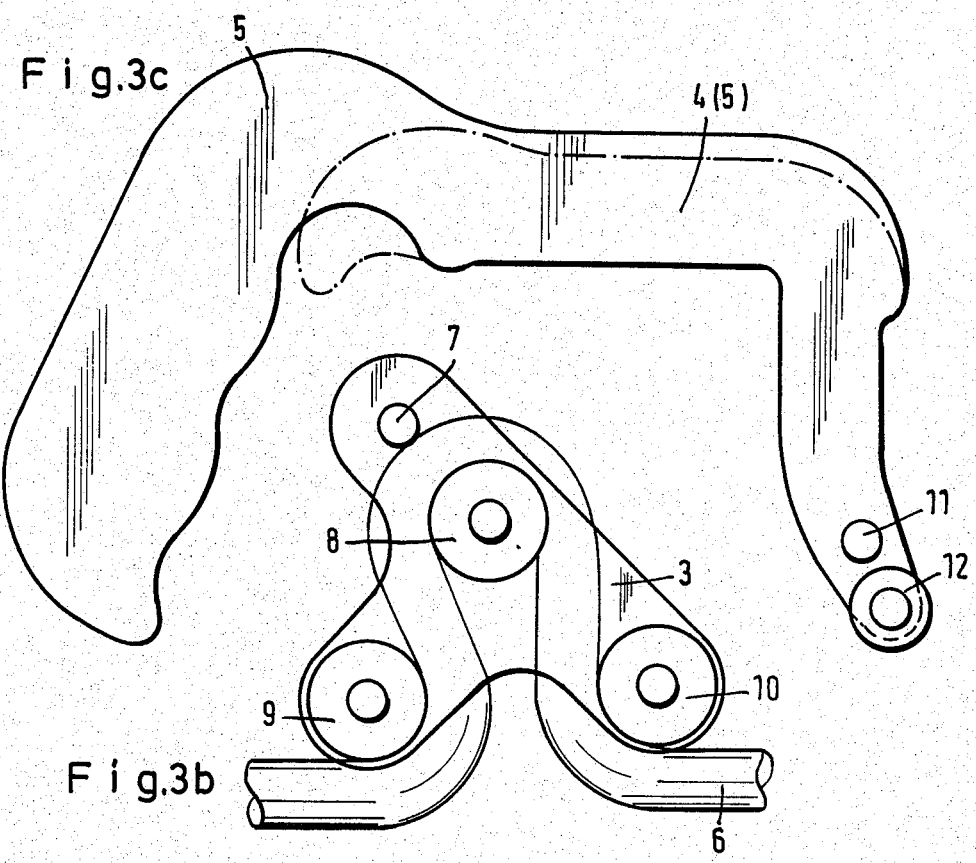
Fig. 3c
Fig. 3b
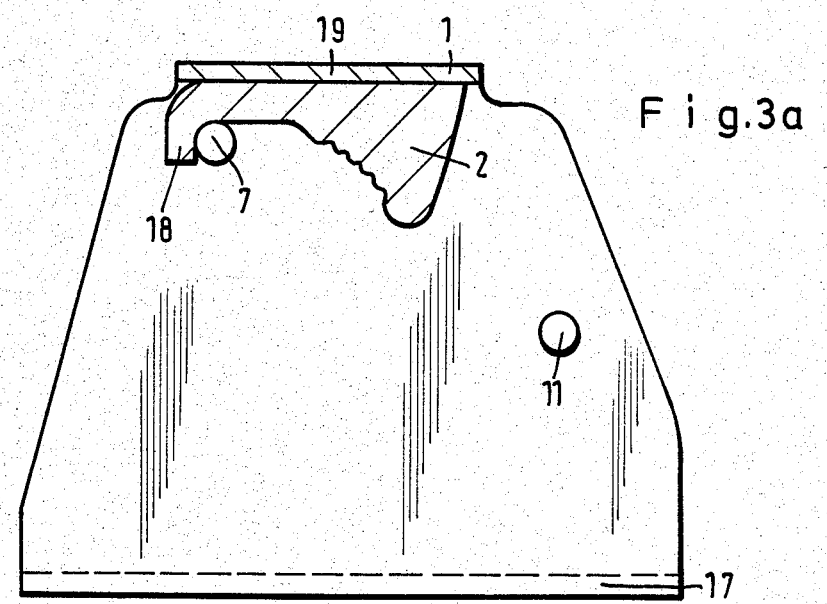
Fig. 3a

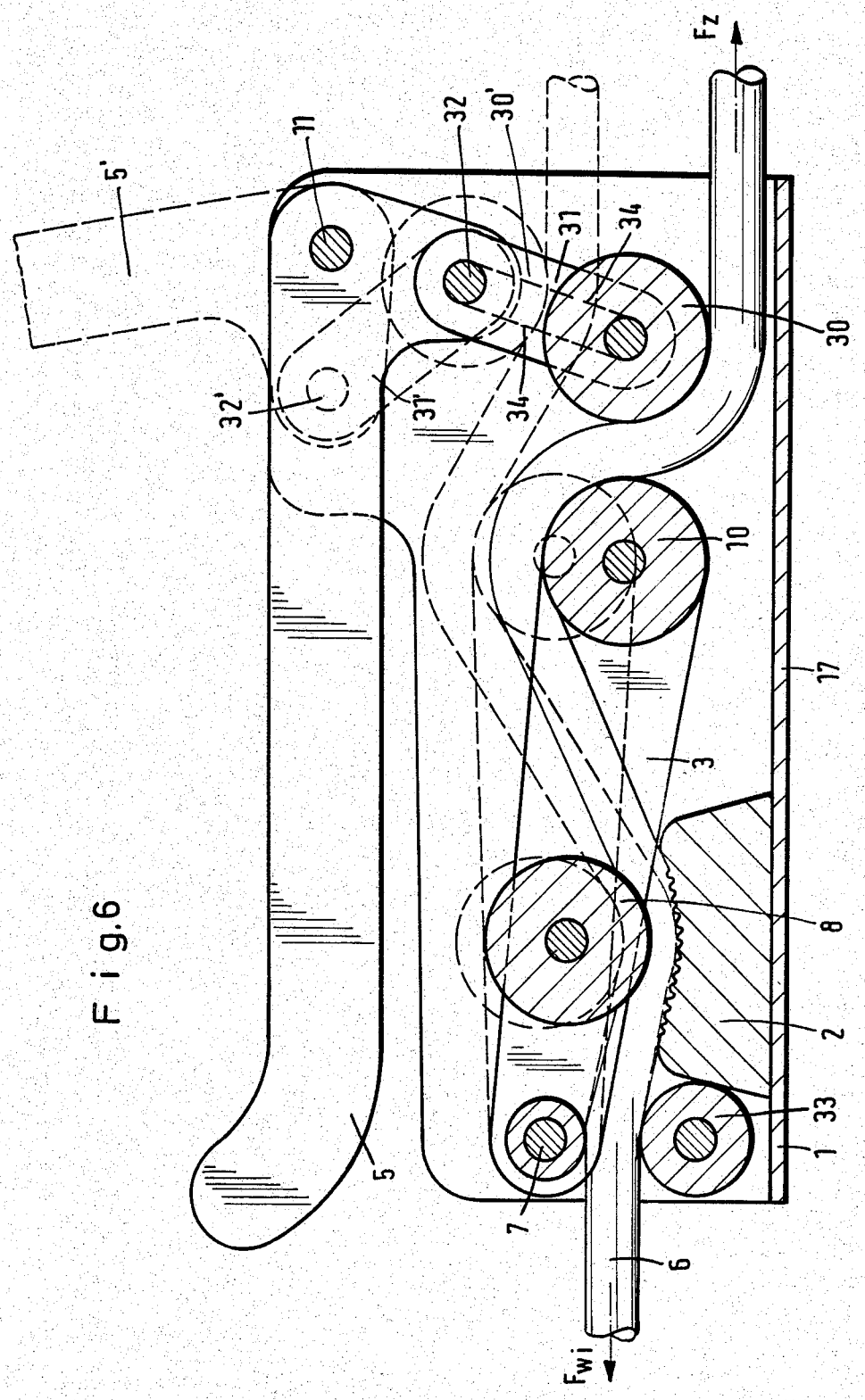

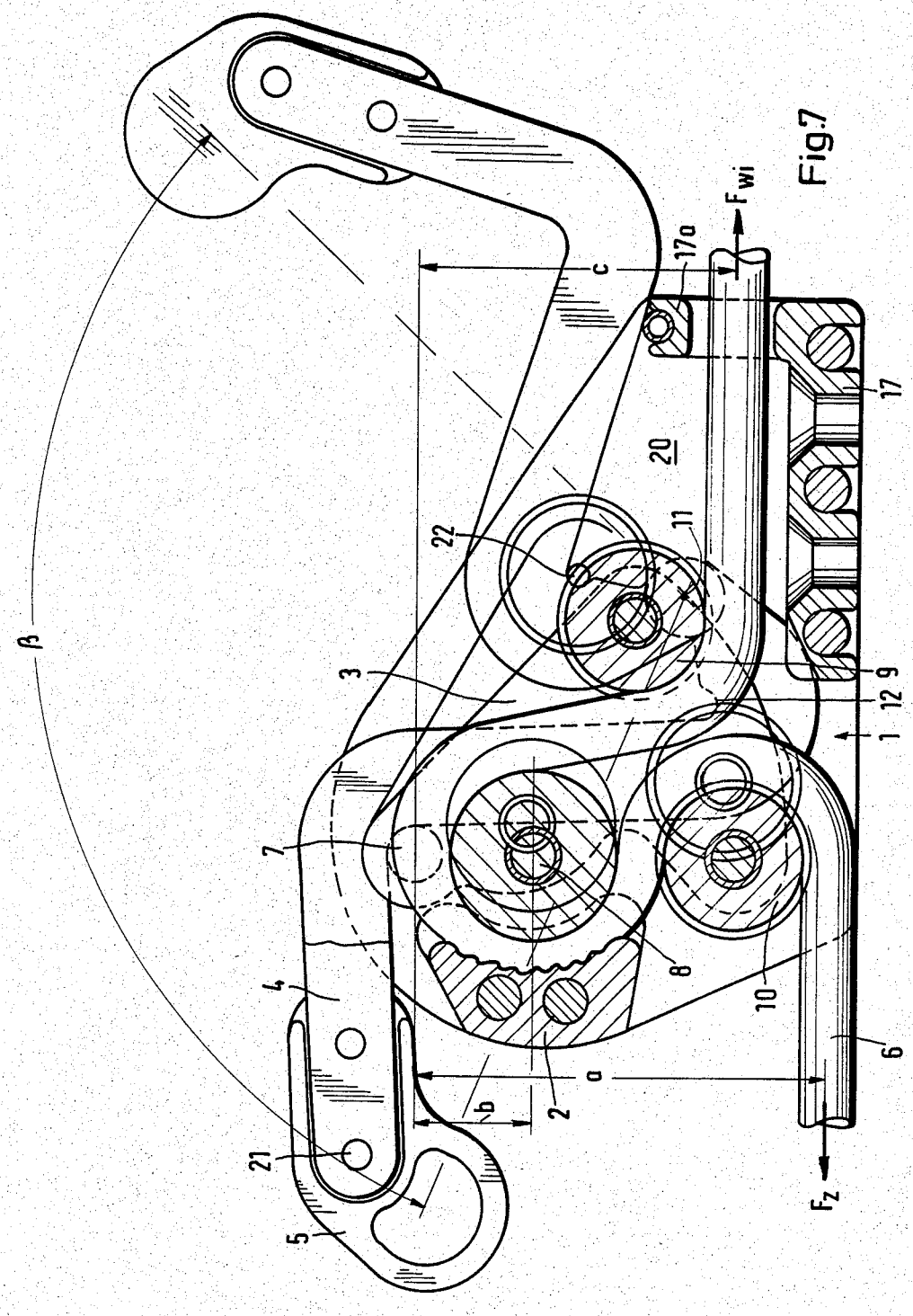

APPARATUS FOR RELEASABLY CLAMPING AN ELONGATE MEMBER

The invention relates to an apparatus for releasably clamping an elongate member in particular in cable or line, comprising a housing, a clamping lever which is rotatably mounted therein and two clamping surfaces, of which the first is arranged on the housing and the second is arranged on the clamping lever and between which the elongate member passes, the elongate member also being taken around at least one direction-changing location, wherein the clamping lever is so designed for a lever ratio b/a that at most the coefficient of friction $\mu$ is attained at the friction location.

In safety belt systems, automatic belt retracter units are known, in which the clamping lever is tilted in one direction or the other by the belt. Such an arrangement also suffers from the disadvantage that a self-amplifying moment inevitably occurs, which results in local overloading of the material of the belt, possibly being to such an extent as to constitute a self-locking action. In most of the known clamping arrangements, a certain self-locking moment is even desired, because at first glance it appears to ensure that the belt is securely clamped. In that connection however, there is the fear of the belt being constantly rubbed away, by the normal movements of the user.

In a known apparatus for clamping a cable or line, the clamping effect is produced by virtue of an unfavourably steep position of the operating lever. Disposed in a housing, at one side, in the upper region thereof, is a mounting about which the operating lever, at the operative free end of which are provided sharp teeth, rotates on a circle in such a way that the teeth finally move in the direction in which the cable goes out of the housing. The clamping action begins, at that point. However, there is the disadvantage in that arrangement that the operating lever is in a very steep position, being in some cases at only 5° to 10° to the vertical. In the clamping condition, the teeth dig sharply into the cable or line and the position of the operating lever gives rise to high squeezing or crushing forces. Those forces abruptly increase in a direction normal to the direction in which the cable extends, the more the cable is subjected to a pull. That gives rise to a tearing effect.

The arrangement is released by means of a hand lever which is intended to lift the operative lever out of the clamping position against the pulling force or tension of the cable or line, but with the disadvantage that the lever has additionally to be lifted against the friction-shearing forces which have been built up, at the clamping surface. For that purpose, a lever transmission ratio of about 3:1 or 4:1 is available.

Therefore, with the known clamping apparatus, a secure hold on the elongate member to be clamped can only be achieved by means of sharp teeth which cause damage to woven material. If that were not the case, an even smaller wedge angle (less than 5°) would be required, with the consequence of an immediate self-locking or jamming action, that is to say, it would then no longer be possible to open the arrangement, without ruining the cable. In addition, the cable is clamped only with a shearing movement of the clamping jaw against the cable. However, it will be apparent that shearing forces wear out the cable. If a larger wedge angle is desired, then sharp teeth have to be used, that is to say, the arrangement has a high coefficient of friction $\mu$.

However, the use of sharp teeth is contrary to the requirement for treating the cable or line carefully.

In regard to safety belts in vehicles, an automatic clamping device has already been developed and described in German patent specification No. 2 432 956, which operates with a minimum clamping force, which provides for careful treatment of the belt, and which releases upon being relieved of load, without the fear of tearing the belt. In that arrangement, the belt is passed without friction between two clamping surfaces and through the clamping lever, as referred to in the opening part of this specification. While many advantages and aims are already achieved, as is desired, with the known clamping apparatus, the apparatus cannot be of less than a certain structural size which is determined by the length of the clamping lever because the belt is guided parallel thereto from its beginning to its end and, at both ends thereof, is guided into and out of it, in a perpendicular direction.

The problem of the present invention is to improve the clamping apparatus of the kind set forth in the opening part of this specification, in such a way that the amount of space required is reduced, while nonetheless ensuring that the elongate member is securely held, even under a steady or fluctuating pull, as well as ensuring easy and properly defined opening. The invention also seeks that the apparatus should retain the advantages which are achieved in the belt clamping apparatus, namely that the elongate member is treated carefully and is released without tears in the material.

According to the invention, that problem is solved in that disposed on the clamping lever are three direction-changing locations, the axes of which extend parallel to the axis of rotation of the clamping lever and parallel to each other and clamp a triangle, and that a release lever which is rotatable mounted in the housing is provided with a release cam for acting on an engagement member secured to the clamping lever. Due to the configuration of the novel apparatus, the clamping force is once again virtually a pure normal force, for the clamping surface on the lever is pressed towards the clamping surface on the housing, in a direction perpendicular to the longitudinal direction of the cable. That means that the cable is taken past the clamping surface extremely carefully as the clamping force, the pure normal force, is always at an optimally low value, although sufficiently high. Therefore, the cable is subjected virtually only to compression forces, and not shearing loadings, shearing stresses and the like, which could damage the plaiting.

In a preferred embodiment, the clamping lever is made up of two plates which are of substantially the same configuration in plan view and which are joined together by rotational and/or direction-changing locations, and are held at a spacing from each other. In particular, the rotary mounting for the clamping lever, which is arranged outside the clamped triangle, is provided in the form of a spacer. In addition, the direction-changing means which are secured to the clamping lever may also be in the form of sleeves, pins, screws or the like, and serve as spacer members. In addition, in that embodiment, the clamping lever is arranged rotatably between two parallel wall portions of the housing, which are also arranged at a spacing from each other, while preferably, inter alia, the clamping jaw which is fixed with respect to the housing acts as a spacer portion which, by means of rivets therethrough, holds the two wall portions of the housing at a spacing from and parallel to each other and which at the same time is arranged beside the rotatable clamping lever.

In another advantageous embodiment of the invention, the release lever is arranged between the outside wall portions of the housing on the one hand and the clamping lever on the other hand. That arrangement provides for a stable while nonetheless compact construction which is of light weight, using simple means.

In accordance with the invention, it is also desirable for the control member to be a roller, or a projection which projects from the clamping lever in the direction of the axis of rotation thereof and overlaps the release lever. Such a projection may be in the form of a peg, pin or the like and only needs to project from the clamping lever on one side in such a way that the release lever is overlapped, that is to say, the projection projects laterally beyond the release lever in such a way that it necessarily comes into engagement with that projection, in a given position.

It is also advantageous if, in accordance with the invention, the second clamping surface which is on the clamping lever and/or the downstream-end direction-changing means are in the form of rollers, wherein the first clamping surface is in the form of an arcuate clamping jaw which corresponds to the clamping roller. It is also desirable for the release cam to be a pressure roller. When the clamping surface on the lever is in the form of a roller, thereby forming what is referred to as a clamping roller, it is possible to omit a further direction-changing or guide roller which would otherwise be required in the region of the rotary mounting for the clamping lever in the housing, if an extremely highly curved loop is formed in the cable and if the arrangement is to be of an optimally small height, in order thereby to provide a compact clamping apparatus.

In accordance with the invention, the apparatus may also be of such a configuration that the clamping lever—in the line from its rotary mounting in the housing by way of the clamping surface to the downstream-end direction-changing means which is in the form of a cam follower—is disposed in an inclined position at an angle of from 30° to 60° with respect to the base surface of the housing, which is taken as being horizontal, wherein the direction of the pulling force in the elongate member is provided as being substantially parallel to the base surface.

In spite of complying with the conditions which are set forth in accordance with the invention, the physical clamping lever may be of various design configurations. The imaginary line in the clamping lever from the rotary mounting on the housing by way of the clamping surface on the lever to the downstream-end direction-changing means may be straight or curved. If the clamping lever is set in an inclined position at the above-mentioned angle of for example 45° with respect to the base surface of the housing, the housing is considerably reduced in size. Nonetheless, in the above-described embodiment, the direction of the elongate member or cable is changed in the required manner, thereby giving the above-mentioned operative lever which is the projection at a right angle to the direction of pull of the cable. By virtue of the features according to the invention, in particular in the region of the rotary mounting of the clamping lever in the housing, the housing of the clamping apparatus can be made shorter, without having to sacrifice height. Nonetheless, the required lever ratio can be set to optimum values so that there is no fear of slipping, that is to say, creeping of the cable, occurring under load.

The release lever which is mounted rotatably in the housing is preferably a hand lever which, upon release of the apparatus, is required at maximum to overcome the actual pulling force of the cable, but which advantageously does not have to overcome additional frictional, shearing and wedge-pinching force or jamming forces in the direction of release, as such forces do not occur. Controlled slippage can be produced at the clamping location, by suitably controlling the hand lever force. In sailing, when the clamping apparatus according to the invention can be put to a particularly advantageous use, easy controlled adjustment is required for slackening off or bearing away. However, when performing a release operation, with a perceptible transitional region, the point of slip is accurately defined by virtue of the features in accordance with the invention, and is always possible in the same position of the lever, assuming that a given type and thickness of cable or line is used.

Another advantage lies in the short stroke movements of the downstream-end direction-changing means with the clamping lever in order to go from the released position back into the absolutely secure locking position. By virtue of that arrangement, the cable can be set to desired positions with a very high degree of precision, and the desired cable or line settings are not brought to nothing, not even disturbed, by setting actions or by creep phenomena.

Having regard to those considerations, the above-mentioned preferred embodiment of the invention is characterised in that a direction-changing roller is rotatably mounted on the clamping lever, on the rearward side, at a spacing perpendicularly to the line of the lever between the rotary mounting and the direction-changing roller, whereby the elongate member forms a U-shaped loop, with three changes in direction. The housing of the clamping apparatus according to the invention is to be construed as a component of U-shaped cross-section with a cover which connects the two free limb portions of the U-shape. In that preferred embodiment, the cover and the base surface of the housing are parallel to each other, preferably being in a horizontal plane, in a vehicle. In that respect, the cover may be at the bottom and the base surface may be at the top, or vice-versa. Other arrangements of the clamping apparatus, in space, are also possible. For the sake of ease of comprehension, it is assumed that the base surface is horizontal. In the embodiment just described above, the direction of pull of the cable or line is also horizontal, both at the upstream or entry end and at the downstream or outgoing end. Therefore, the above-mentioned loop is formed in the cable or line, with the cable twice changing in direction, perpendicularly to the horizontal, namely around the direction-changing means at the upstream or entry end of the apparatus, in an 'upward' direction (towards the cover), between the rotary mounting of the clamping lever in the housing and the clamping roller, extending therearound through an angle of about 180°, and back again in a 'downward' direction (towards the base surface), in order then to be deflected back into the horizontal direction again, by the direction-changing means at the downstream or exit end of the apparatus. As stated above, that causes the elongate member or cable to form a U-shaped loop.

By virtue of the direction-changing roller at the rearward end or the upstream end being rotatably connected to the clamping lever, when the arrangement is viewed perpendicularly on to the loop, the clamping lever is of a substantially triangular configuration, the hypotenuse of which is the imaginary line which is at the above-mentioned angle of for example 45° with respect to the base surface. The direction-changing roller at the entry end or the rearward end is disposed at the vertex of the triangle, opposite the hypotenuse or lever line. If the direction-changing means at the entry end is moved away from the loop formed by the cable or line, then the clamping lever must necessarily rotate about its mounting, and the clamping of the cable between the two clamping jaws is released. That arrangement advantageously affords the possibility of further shortening the cable, in the clamped condition. Therefore, the cable is pulled through in a rearward direction, that is to say, in the opposite direction to the direction in which the cable is going out of the apparatus. If, when pulling in the line or cable, it is automatically relieved of load at the clamping means, it will be seen that that ensures that the plaiting of the cable or line is treated gently, and, in accordance with the invention, there are no shearing forces, with the result of cable or line wear, as in the case of the known wedge clamping systems.

The above-described embodiments show the high degree of freedom enjoyed by the designer in designing the clamping lever. The lever may be of a triangular, square or rectangular or round configuration, and may be disposed rotatably in various positions relative to the base surface, provided only that the above-mentioned effective or operative lever—that is to say, the projection of the lever line between the point of rotation of the clamping lever and the downstream-end direction-changing means, at a right angle to the direction of cable pull—is in the correct relationship with the effective lever between the rotary mounting of the clamping lever and the clamping roller. That so-called smaller effective lever is always to be selected such as to give a good secure normal force clamping action between the two clamping surfaces, without giving rise to shearing forces or a wedge-jamming action. Then, when the short effective lever is established, the spacing between the rotary mounting of the clamping lever in the housing, from the downstream-end direction-changing means, can be selected to be of the optimum value, in a suitably advantageous design configuration, depending on the conditions in respect of space available.

For the short effective lever, the spacing between the rotary mounting of the clamping lever in the housing on the one hand and the clamping roller on the other hand will generally be as large as the thickness of the cable or line, or greater. That is particularly desirable if the cable is taken through between the two points. In another embodiment however, the cable may also be taken between the clamping jaws, being laid over the rotary mounting of the clamping lever, so that the short effective lever, that is to say, the spacing between the rotary mounting and the clamping roller, can then be even shorter. When sailing, it is frequently desirable to let a line run out quickly, so that more moderate bending radii in the line may be more desirable.

It is also advantageous, in accordance with the invention, for the clamping jaw to be displaceable relative to the housing and to be coupled to the clamping lever by way of link means or pivot means. In that arrangement, the stroke movement of the clamping lever or the design components which trigger the movements thereof may advantageously be reduced, for full opening. For example, by virtue of that arrangement, the required pivotal movement of a hand release lever can be reduced, or the retraction movement of the cable or line at the upstream direction-changing means may already result in the clamping apparatus being completely opened, with just a small motion. The link or pivot means may be a peg or pin which is secured to the clamping lever and which is disposed in a slot on the clamping jaw of the housing. From the design structure point of view however, the reverse is equally effective (pin or peg on the clamping jaw on the housing).

Another advantageous embodiment of the invention provides that the clamping jaw can be adjusted relative to the housing, by way of an adjusting screw. That arrangement makes it possible to adjust the apparatus, to suit different thicknesses of cable or line. The apparatus should always be set to produce the normal force acting on the cable or line, so that the operating geometry of the clamping lever can be kept constant. In other words, the position of the clamping lever in the clamping condition should be the same so that the ratio of the long and the short effective levers remains constant.

At the same time, the adjusting screw may also serve as a support means for supporting the clamping jaw of the housing, on the housing, thereby ensuring for example that the clamping jaw cannot slip away, even if it is only braced against the cover of the housing. The adjusting screw would then help to carry the pressure which is applied to the clamping jaw of the housing, by way of the clamping roller on the lever, and which tries to urge the clamping jaw away. By virtue of that arrangement, the heavy loading on the cover of the housing can be reduced, using components which are already present. Alternatively, in another embodiment, or in addition to that having the adjusting screw, it would be desirable to provide a hook-shaped projection or extension portion on the clamping jaw of the housing, which extension portion bears against the rotary mounting of the clamping lever on the housing.

Another advantageous embodiment of the invention is characterised in that, for releasing the clamping action, the pressure roller can be pivoted about the rotary mounting of the release lever to such an extent that, in the terminal release position, it is disposed on the other side of the line between the direction-changing roller and the rotary mounting. That feature provides that the clamping lever remains open after the apparatus has been opened, that is to say, after the hand release lever has been pivoted into the open position; for, in that position, the pressure roller presses against the direction-changing roller as it were over a dead point. Therefore, the pressure roller can carry a clamping lever moment in the clamping closing direction. In that connection, the hand release lever rests with its own weight on an abutment for the hand release lever, which is secured to the housing.

If the height of the apparatus is further drastically reduced, with a slight increase in the length of the housing, it is possible for the cable or line to extend in a Z-shaped configuration, which is produced by an additional support or direction-changing roller at the exit end of the apparatus, that roller being adjustable or fixed with respect to the housing. In an apparatus of the kind set forth in the opening part of this specification, it is desirable, in accordance with the invention, if at least two direction-changing locations or means are arranged on the clamping lever, with the axes thereof extending parallel to the axis of rotation of the clamping lever and parallel to each other, and if a release lever which is mounted rotatably in the housing carries a rotatably mounted elbow lever which serves as a rigid rod or bar for a support roller, the spindle or shaft of which is guided in a slot which is fixed with respect to the housing. With that design configuration, the construction can be made very compact and reduced in size, in a direction in space.

Figure 8:
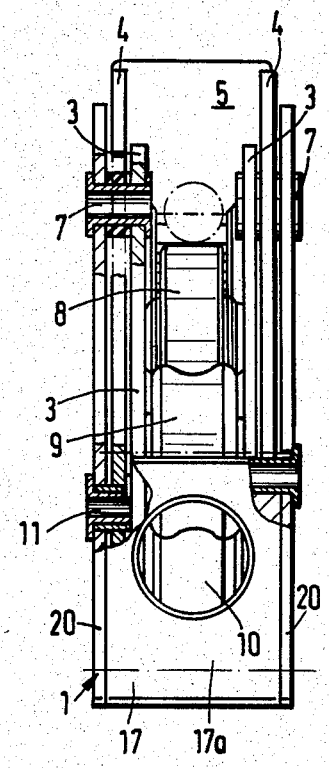
Figure 5:
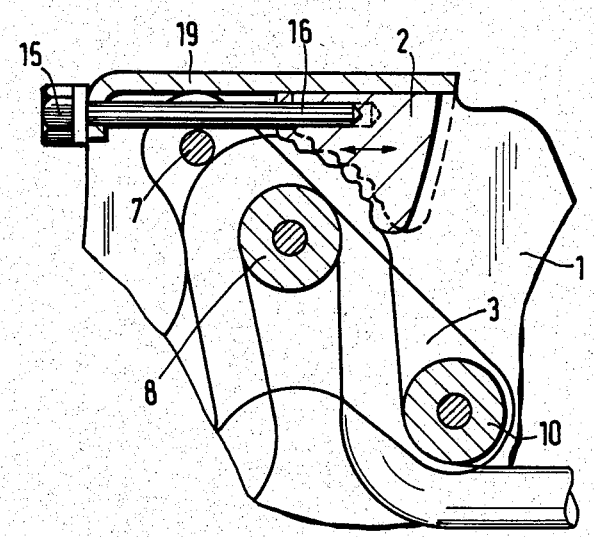

Further advantages, features and possible uses of the present invention will be apparent from the following description of preferred embodiments, with reference to the drawings in which:

FIG. 1 shows a diagrammatic side view through a first preferred embodiment of the invention, with a triangular clamping lever and with the cable or line forming a U-shaped loop, FIG. 2 shows a broken-away view of part of the FIG. 1 construction in section taken along line II—II, FIGS. 3a to 3c show the components of the apparatus illustrated in FIG. 1, separately, FIG. 4 shows a broken-away side view in cross-section, similar to that shown in FIG. 1, but in which the coupling link between the clamping lever and the clamping jaw carried by the housing is shown in the form of a second preferred embodiment, FIG. 5 is a view similar to that shown in FIG. 4 of a third preferred embodiment having an adjusting screw for adjusting the clamping jaw carried by the housing, FIG. 6 is a sectional side view, similar to that shown in FIG. 1, of another embodiment in which the cable or line extends in a Z-shaped configuration, FIG. 7 shows another embodiment of the invention, illustrated in a similar view to those shown in FIGS. 1 and 6, and FIG. 8 is a sectional view similar to that shown in FIG. 2, but showing further details in the embodiment shown in FIG. 7.

The housing comprises a base surface 17 out of which the side surfaces 20 are bent in a U-shaped configuration. The limb portions of the U-shaped configuration are connected to the cover 19. Although in cross-section the housing may be in the form of a closed U, it may also be open at the bottom, in the region of the base surface 17, as shown in the drawings.

The clamping jaw 2, which is carried by the housing, is secured to the cover 19 of the housing 1. In the sectional side views, in the right-hand part thereof, the clamping jaw 2 is of a roller contour, corresponding to the clamping roller 8 which is carried by the clamping lever 3, being rotatably secured thereto and having the particularly preferred low degree of rolling resistance (whereby the cable or line 6 is treated gently). On the left, the clamping jaw 2 has a hook portion 18 which engages around the rotary mounting 7 of the clamping lever 3 in the housing 1, and which provides additional support for the clamping jaw 2.

In the embodiments shown in FIGS. 1 to 5, the clamping lever 3 is triangular in side view, as illustrated herein. The imaginary lever line from the rotary mounting 7 in the housing 1, by way of the clamping roller 8, to the direction-changing location 10 at the exit or downstream end of the apparatus, being in the form of a roller, is a straight line. The straight line 7, 8, 10 is disposed at an angle α (see FIG. 1) of about 30° with respect to the base surface 17 of the housing 1. The third point of the triangular clamping lever 3 is the rearward direction-changing roller 9.

In addition, a hand release lever 4 is pivotally mounted in the housing 1 by way of the rotary mounting 11; the release lever 4 engages in a L-shaped configuration around the housing 1, and in this embodiment in particular extends over the cover 19. A further lever 5 is secured to the lever 4 by means of rivets 21, for extension purposes, so as to provide a good possibility of gripping the lever with the index finger or even with the entire hand. The release lever 4 is rotatable in the housing, about the above-mentioned rotary mounting 11. A pressure roller 12 is disposed rotatably at a short distance from the rotary mounting 11 (opposite the gripping portions 5). The pressure roller 12 is arranged closely adjacent the exit-end roller 10 on the clamping lever 3 and, upon movement thereof, can come into operative engagement with the roller 10. Also provided on the housing 1 is an abutment 13 for limiting the rotary movement of the release lever 4, 5.

The spacing between the rotary mounting 7 of the clamping lever 3 and the clamping roller 8 on the lever line is the short effective lever b. The long effective lever a is the projection at a right angle to the direction of pull $F_z$ or $F_{wi}$ in the cable or line 6, more specifically, from the rotary mounting 7 to the outer periphery of the exit-end roller 10, wherein that effective lever a produces the clamping force. The spacing between the rotary mounting 7 and the middle of the cable or line 6 at the rearward end is denoted as the effective lever arm c of the clamping lever 3 with respect to the pull-in line (winch). Thus, a is the effective lever arm (or effective lever) of the clamping lever 3 with respect to the pull line or cable $F_z$, and b is the effective lever arm (short effective lever) of the clamping lever 3 with respect to the clamping location 8, 2.

In operation, the line or cable force $F_z$ pulls the clamping lever 3 with its clamping roller 8 against the clamping jaw 2. The clamping roller 8 produces the above-mentioned pure normal force with which the cable 6 is pressed against the clamping jaw 2. That normal force arises from the lever ratio a/b, giving:

$$F_N = a/b \cdot F_z \text{ (here } a/b \approx 2.5\text{)}$$

For all pulling forces $F_z$, the cable or line is subjected to absolutely slip-free clamping if the coefficient of friction $\mu$ at the clamping location is as follows:

$$\mu \geq a/b$$

as at least the following applies, in regard to the holding condition:

$$F_N \cdot \mu = F_z$$

or, for entirely secure holding:

$$F_N \cdot \mu > F_z$$

If the lever ratio a/b and the coefficient of friction are established, from the construction point of view, for reliable clamping, then the normal force $F_N$, which loads the cable or line, is always directly dependent on the pulling force $F_z$.

For the purposes of opening the arrangement or releasing the clamping condition the hand release lever 4, 5 is pivoted upwardly, in a clockwise direction about the pivot point 11 in the embodiments illustrated in the drawings. When that occurs, the pressure roller 12 pressed directly against the load-bearing direction-changing roller 10 of the clamping lever 3, at the cable exit end. With the pivotal movement of the clamping lever 3 with the clamping roller 8 away from the clamping jaw 2, the holding force is released after just a short travel motion and the clamping lever can be easily opened completely in order entirely to release the cable or line 6.

If, due to a strong force pulling the cable back (in the direction $F_{Wi}$), a pull-back force is applied to the lever c by way of the roller 9, then that force results in an (opening) moment which turns the clamping lever 3 back about the rotary mounting 7. That moment increases, in relation to the holding moment $F_z$, in proportion to an increasing length of the lever c. If it is possible from the design structure point of view for the lever c to be made substantially longer than the effective lever a, then the pull-back force $F_{Wi}$ required (for adjustment purposes) is lower than is produced as a holding force at the front end of the arrangement, at the exit thereof. Irrespective of the design of the lever c and the effective lever a, if the pull-back force $F_{Wi}$ is sufficient, the movement of the clamping lever 3 with clamping roller 8 away from the clamping jaw 2, which is an easy movement, results in the cable or line being released so that it can be pulled in. When the force $F_{Wi}$ is no longer applied, then the clamping lever 3 automatically pivots back into the clamping position.

In FIG. 4, the clamping position is shown in solid lines, with the link or connecting means 14 coupling the clamping jaw 2 to the clamping lever 3. It will be seen that the pin can only rotate in the slot by a given amount, whereby the stroke movement of the clamping lever 3 to the fully open position is restricted.

FIG. 5 shows the adjusting screw with head 15 and screwthreaded shank 16, by means of which the clamping jaw 2 of the housing can be displaced in the direction indicated by the double-headed arrow shown in FIG. 5, for example for adjusting the arrangement to different thickness of cable or line.

FIG. 6 shows another embodiment in which the clamping lever 3 is arranged substantially parallel to the base surface 17 of the housing 1 and the clamping jaw 2 is arranged on the base surface 17. The important consideration in this arrangement is the support roller 30 which is additionally fixedly or adjustably mounted to the housing and which permits the pull-out direction $F_z$ in the cable 6 to be deflected into a horizontal direction. In this arrangement, the cable or line 6 is first taken over the direction-changing or guide roller 33 at the rearward end of the arrangement, into the housing, under the rotary mounting 7 and the clamping roller 8, then between the clamping roller 8 and the clamping jaw 2 which is carried by the housing, to pass upwardly into the space between the clamping roller 8 and the guide roller 10, where it is passed around the guide roller 10 and taken out by way of the support roller 30 which is adjustable or fixed with respect to the housing. In this embodiment, the direction-changing roller 33 which is disposed at the rearward end of the arrangement can again be disposed at a different position. It is also possible to envisage the cable or line being introduced over the rotary mounting 7.

The support roller 30, which is adjustable in this arrangement, is guided with its shaft or spindle in a slot 34 which is fixed with respect to the housing and is braced downwardly against the cable or line forces, in the slot 34, by way of an elbow lever 31 which is secured to the hand release lever 5 with rotary mounting 32.

When the lever 5 is rotated about the mounting 11 into the position illustrated by 5', for opening the system, the support roller 30 moves into position 30' as the elbow lever 31 (31') pulls the support roller along the slot 34.

In other words, the embodiment shown in FIG. 6 can be described as follows:

Provided in the housing 1, at top right thereof, is the bore for the mounting 11 of the hand lever 5 while below same is the continuous slot 34 which is slightly inclined and which extends almost perpendicularly (with respect to the base surface 17). In FIG. 6, it is only by chance that the slot 34 is disposed parallel coaxially and centrally with respect to the elbow lever 31. The latter can also be rotated by rotating the hand lever 5 relative thereto and relative to the housing 1, in which case its own rotary mounting is secured to the nose-shaped projection of the lever 5. The elbow lever 31, like a wheel suspension means, is a rigid connecting rod or bar for the support roller 30. In this connection, the rotary mounting 32 of the lever 5 is freely pivotal with respect to the housing; for, the member defining the axis of rotation of the support roller 30 is disposed rotatably approximately at the upper end of the elbow lever 31, at a spacing from the rotary mounting 32. The spindle or shaft of the support roller 30 is longer and passes through the housing 1, the elbow lever 31 and the support roller 30 and is guided in a slot 34 which is fixed with respect to the housing.

In the position shown in solid lines, the support roller is in a position in which it is pushed downwardly or depressed by the elbow lever 31. As the support roller 30 is fixed as in a double link arrangement, the elbow lever 31, it cannot be moved upwardly in the slot 34 when a pulling force is applied in the cable, at $F_z$. On the contrary, the rotating elbow lever 31 alone permits a movement of the support roller 30 along the slot 34.

If now the lever 5 is rotated out of the position shown in solid lines into the upper position shown in broken lines, then the rotary mounting 32 is rotated in a circular path about the mounting 11 as its centre, and thereby pulls the elbow lever 31 into the broken-line position shown, whereby the spindle or shaft of the support roller 30 can slide upwardly along the slot 34, performing a stroke motion. In that movement, the elbow lever 31 rotates to the left relative to the housing.

FIG. 7, which is a similar kind of view to those shown in FIGS. 1 and 6, shows another perferred embodiment in which the same components are denoted by the same references. The housing is generally denoted by reference numeral 1 and has two side walls 20 which are arranged parallel and at a spacing from each other and which are of the same configuration in plan view and which are held together by way of a base portion 17 by means of rivets or screws. At the front, the arrangement has the front plate or panel 17a which represents a kind of facing or screening member and which, as can be seen from the view in FIG. 8, has a circular guide opening for the cable or line 6. The direction-changing or guide roller 10 at the exit end of the arrangement can be seen through the opening for the cable or line 6. When FIGS. 1 and 7 are compared, it should be noted that the pulling force $F_z$ of the cable or line 6 is towards the left in the case of the embodiment shown in FIG. 7, so that the levers a and c are interchanged. In addition, it will be seen that there is the possibility of pivoting the release lever 4 with the knob 5 which is rotatable about the mounting 11 through the angle β.

In the embodiment shown in FIGS. 7 and 8, the engagement portion 22 is not a pressure roller but the surface 12, which is of a cam-like configuration, at the mounting end of the release arm 4. When the release arm 4 is rotated from the left-hand position in FIG. 7 into the right-hand position in which it is pivoted towards the right in FIG. 7 through the angle β, the opening provided with the left reference line 12 comes into engagement against the cam surface of the release arm 4 with the pin or peg portion 22 which is secured to the clamping 3, and thereby pivots the clamping lever 3 towards the right about its pivot location 7 (see FIG. 7). Unlike the embodiment in FIG. 1, it is not the roller 10 at the exit end but the roller 9 at the entry end that is pivoted about the pivot point 7 in an anticlockwise direction in such a way that the entire clamping lever with the clamping roller 8 on the clamping lever releases the cable or line 6. In other words, the manual release lever 4 does not act on the guide roller 10 at the exit end, as in the FIG. 1 construction, but on the guide roller 9 at the entry end. In addition, in comparing the construction shown in FIG. 7 with FIG. 1, the FIG. 7 construction has the position of the clamping jaw 2 shifted towards the left, although it is still secured to the housing, and even serves as a spacer member for the two walls 20 of the housing, as already mentioned above.

FIG. 8 shows the arrangement of the rollers 10 and 9 at the entry and exit ends, and the movable clamping roller 8, being disposed behind each other and above each other respectively, which rollers clamp a triangle in the view shown in FIG. 7, while their axes extend parallel to the axis of rotation 7 of the clamping lever 3 and parallel to each other. In the view illustrated in FIG. 8, the three rollers 8 to 10 are disposed behind and above each other respectively and between the two plates of the clamping lever 3, which, by way of the outside wall portions 20 (and unlike the embodiment shown in FIG. 2) are held fixedly with respect to the housing and at a spacing from each other. Disposed outside the two plates of the clamping lever 3 are the bar-like portions of the release lever 4, while right on the outside, on both sides of the arrangement, are the housing walls 20 which are connected by way of the base portion 17.

The remainder of the arrangements and functions of the components are similar to those described above, so that there is no need for further description at this point.

The angle α between the line, which has already been particularly described in connection with the embodiment shown in FIG. 1, from the rotary mounting 7 in the housing 1 by way of the clamping roller 8 to the guide roller 10, relative to the direction of the pulling force $F_z$ in the cable or line 6, is not shown in FIG. 7, for in that case the angle is about 90°. The rollers are optimised in relation to the thickness of the cable or line in such a way that they can also be arranged closely adjacent to each other without the angle α of about 45°. It will be seen from FIG. 7 that the clamping lever 3 is in a clamping position when the above-mentioned angle α is about 90°, and is released when, as shown in the drawing, it is in the right-hand position in which the angle α is about 5° to 20°, preferably 15°.

I claim:
1. An apparatus for releasably clamping an elongate member passing therethrough which comprises:
   (a) a housing having a clamping lever rotatably mounted therein,
   (b) two opposing clamping surfaces having a clamping position and a release position, one of said surfaces mounted on said housing and one of said surfaces mounted on said clamping lever,
   (c) a plurality of direction changing means positioned within said housing, at least two of said direction changing means mounted on said clamping lever,
   (d) the direction changing means positioned to initially receive said elongate member being a control roller,
   (e) said direction changing means spacedly positioned in a triangular configuration to receive said elongate member in an alternate under and over manner whereby the direction of said elongate member passing through said housing is changed a plurality of times, and
   (f) a lever means to reciprocally move said clamping surfaces from said clamping position to said release position, by action on said clamping lever through said control roller.

2. The apparatus of claim 1 wherein said elongate member changes direction three times within said housing.

3. The apparatus of claim 1 wherein said direction changing means have axes and said axes are positioned parallel to each other and parallel to the axis of said clamping lever.

4. The apparatus of claim 1 wherein said direction changing means are rollers.

5. The apparatus of claim 1 wherein one of said direction changing means provides a clamping surface.

6. The apparatus of claim 1 wherein said clamping surface positioned with said housing is arcuate.

7. The apparatus of claim 1 wherein said direction changing means are positioned to change the direction of said elongate member three times at about 90° each time.

8. The apparatus of claim 1 wherein said elongate member passes under said control roller.

9. The apparatus of claim 1 wherein said elongate member is a rope.

* * * * *